(12) United States Patent
Teng

(10) Patent No.: US 10,710,468 B2
(45) Date of Patent: Jul. 14, 2020

(54) VEHICLE POWER SUPPLY DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Hao Teng, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 65 days.

(21) Appl. No.: 16/095,562

(22) PCT Filed: Sep. 12, 2017

(86) PCT No.: PCT/JP2017/032890
§ 371 (c)(1),
(2) Date: Oct. 22, 2018

(87) PCT Pub. No.: WO2018/061748
PCT Pub. Date: Apr. 5, 2018

(65) Prior Publication Data
US 2019/0168634 A1    Jun. 6, 2019

(30) Foreign Application Priority Data

Sep. 30, 2016  (JP) .................................. 2016-193343

(51) Int. Cl.
*B60L 58/18* (2019.01)
*H01M 10/44* (2006.01)
(Continued)

(52) U.S. Cl.
CPC ................. *B60L 58/18* (2019.02); *B60L 3/00* (2013.01); *B60L 3/0092* (2013.01); *B60L 50/50* (2019.02);
(Continued)

(58) Field of Classification Search
USPC ........................................................ 320/134
See application file for complete search history.

(56) References Cited

U.S. PATENT DOCUMENTS

2014/0222294 A1    8/2014   Sligiyama et al.
2016/0301233 A1*  10/2016   Takeuchi ................ B60L 53/14
(Continued)

FOREIGN PATENT DOCUMENTS

| JP | 2013-176197 A | 9/2013 |
| JP | 2014-150672 A | 8/2014 |
| JP | 2016-132402 A | 7/2016 |

OTHER PUBLICATIONS

Oct. 24, 2017 Search Report issued in International Patent Application No. PCT/JP2017/032890.

*Primary Examiner* — Mohammed Alam
(74) *Attorney, Agent, or Firm* — Oliff PLC

(57) ABSTRACT

A vehicle power supply device that includes a control unit that performs at least a quick charging control which causes the first voltage converter to perform the charging operation and causes the second voltage converter to perform the charging operation, and a charging/discharging control which causes the first voltage converter to perform the charging operation and causes the second voltage converter to perform the discharging operation.

9 Claims, 6 Drawing Sheets

(51) Int. Cl.
*H02M 3/155* (2006.01)
*B60L 3/00* (2019.01)
*H02J 9/06* (2006.01)
*H02J 7/34* (2006.01)
*H02J 7/00* (2006.01)
*H01M 10/48* (2006.01)
*B60L 50/50* (2019.01)
*H02M 3/158* (2006.01)
*B60L 50/60* (2019.01)
*H02M 1/00* (2006.01)
*H01M 10/42* (2006.01)

(52) U.S. Cl.
CPC .............. *B60L 50/60* (2019.02); *H01M 10/44* (2013.01); *H01M 10/48* (2013.01); *H02J 7/00* (2013.01); *H02J 7/34* (2013.01); *H02J 7/342* (2020.01); *H02J 9/06* (2013.01); *H02J 9/061* (2013.01); *H02M 3/155* (2013.01); *H02M 3/158* (2013.01); *H01M 2010/4271* (2013.01); *H02M 2001/007* (2013.01); *Y02T 10/7005* (2013.01); *Y02T 10/92* (2013.01); *Y02T 90/127* (2013.01)

(56) References Cited

U.S. PATENT DOCUMENTS

2018/0083477 A1* 3/2018 Tian ................... H02J 7/027
2019/0168634 A1* 6/2019 Teng ................... B60L 58/18

* cited by examiner

VEHICLE POWER SUPPLY DEVICE

This application is the U.S. National Phase of PCT/JP2017/032890 filed Sep. 12, 2017, which claims priority from JP 2016-193343 filed Sep. 30, 2016, the entire disclosure of which is incorporated herein by reference.

BACKGROUND

The present disclosure relates to a vehicle power supply device.

In the field of power supply devices for vehicles, a backup system is known that maintains a power supply to a load by performing the power supply from an auxiliary power supply when a failure and the like occurs in the main power supply. For example, the power supply system disclosed in JP 2013-176197 is configured such that the main power supply and a backup load are electrically connected through the power supply device. The backup load requires continual operation even when an abnormality such as a reduction in the voltage of the main power supply or a failure occurs. This system is configured so that power is continuously supplied to the backup load from the power supply device even when the main power supply has an abnormality.

SUMMARY

However, this type of power supply device requires that the auxiliary power supply be charged at suitable periods. For example, when the output voltage of the auxiliary power supply is low immediately after the ignition switch has been switched on, the auxiliary power supply requires that the output voltage of the auxiliary power supply be charged up to a suitable level in which the backup operation is possible after the ignition switch has been switched on. However, in the existing technology in which a discharging operation is stopped during the charging of the auxiliary power supply, there is a problem that when a failure or other abnormality occurs in the main power supply during charging, the power supply is cut off during the period from the detection of the abnormality until the power supply from the auxiliary power supply (backup operation) has started. Furthermore, this problem is more likely to occur as the charging period of the auxiliary power supply grows longer.

An exemplary aspect of the disclosure provides a vehicle power supply device that is able to perform a quick charging operation in which the charging time can be shortened when a second power supply unit is charged with power from a first power supply unit, and a charging/discharging operation in which, even when the power supply of the first power supply unit is interrupted during charging, a discharging state can be maintained before and after the interruption.

A vehicle power supply device according to the present disclosure has: a first conductive path electrically connected to a conductive path on an input side that serves as a power pathway from a first power supply; a second conductive path that is electrically connected to the conductive path on the input side and branches off as a path different from the first conductive path, and is electrically connected to a conductive path on an output side; a third conductive path that is electrically connected to the second conductive path and the conductive path on the output side; a first voltage converter that performs at least a charging operation for stepping up or stepping down the voltage applied to the first conductive path and applying an output voltage to a conductive path on a second power supply side connected to the second power supply; a second voltage converter that performs at least a charging operation for stepping up or stepping down a voltage applied to the third conductive path and applying an output voltage to the conductive path on the second power supply side, and a discharging operation for stepping up or stepping down a voltage applied to the conductive path on the second power supply side and applying an output voltage to the third conductive path; and a control unit that performs at least a quick charging control which causes the first voltage converter to perform the charging operation and causes the second voltage converter to perform the charging operation, and a charging/discharging control which causes the first voltage converter to perform the charging operation and causes the second voltage converter to perform the discharging operation.

The vehicle power supply device is able to cause both the first voltage converter and the second voltage converter to perform the charging operation when the control unit performs the quick charging control. Because the charging time of the second power supply can be shortened due to the quick charging control, the charging voltage of the second power supply can be easily raised to a suitable level earlier, and a situation in which the timing of the power supply being cut off arrives during the quick charging control is less likely to occur.

In addition, the first voltage converter is caused to perform the charging operation and the second voltage converter is caused to perform the discharging operation when the control unit performs the charging/discharging control. That is, during the charging/discharging control, even when, hypothetically, the power supply from the first power supply is interrupted during the charging by means of the charging/discharging control, the charging state of the second power supply is continuously maintained before and after the interruption because the discharging operation of the second power supply can be continued by the second voltage converter while the charging operation of the second power supply is being performed by the first voltage converter.

Furthermore, because two useful controls can be used separately with regard to the "problem of the power supply of the first power supply unit being cut off during charging" in this way, the above problem can be addressed and freedom for charging the second power supply unit can be enhanced.

DETAILED DESCRIPTION OF EMBODIMENTS

Figure 1:
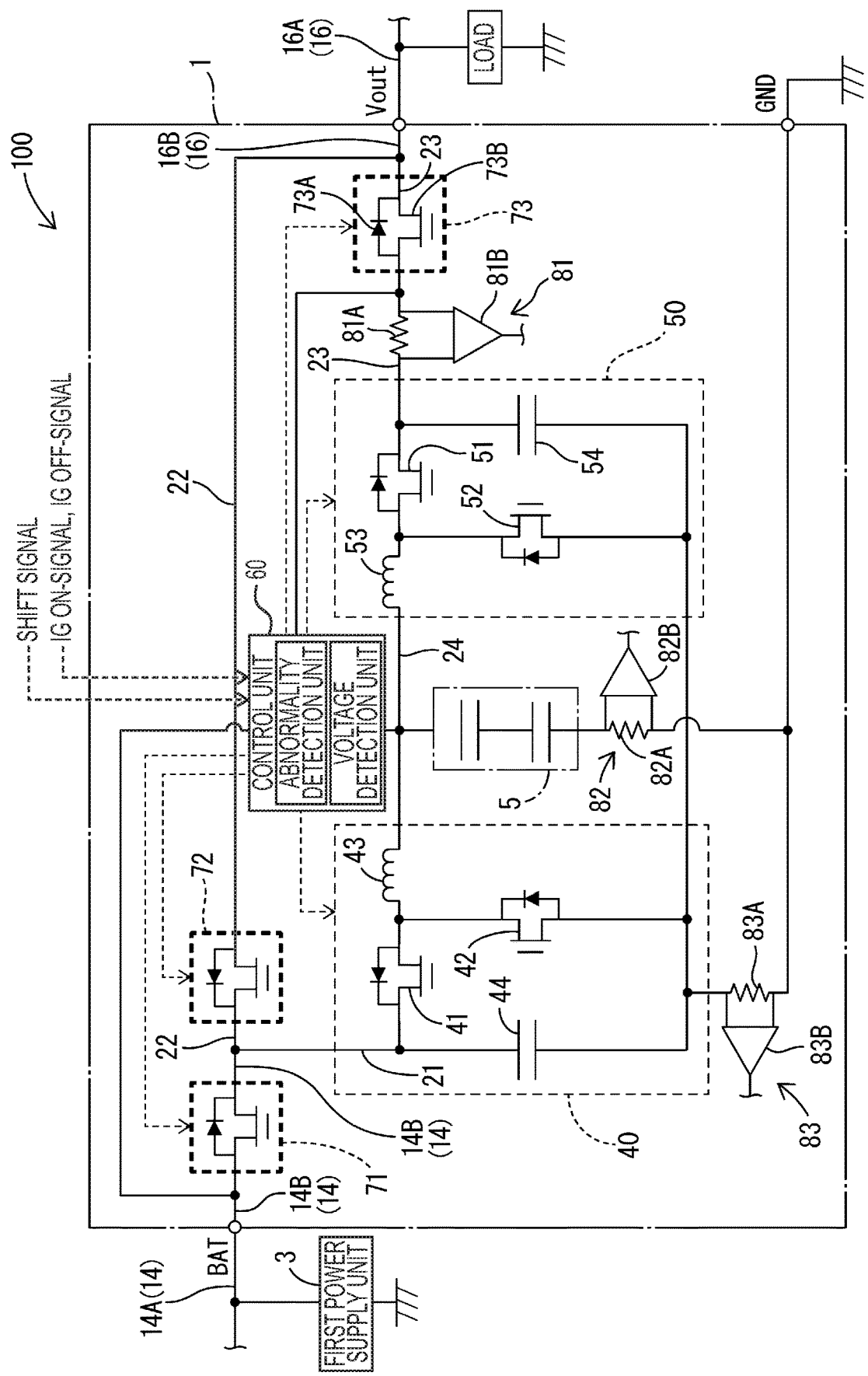
FIG. 1 is a circuit diagram schematically showing a vehicle power supply system provided with a vehicle power supply device according to a first embodiment.

A desirable mode of the disclosure is described below.

A control unit may function so as to perform a quick charging control when a starting switch for switching a vehicle in which the power source device is mounted to a state in which travel is possible, is turned on, and a charging/discharging control when a predetermined condition is established after the starting switch has been turned on.

This vehicle power supply device is capable of promptly increasing an output voltage because charging can be performed quickly after the starting switch has been turned on even when the output voltage of a second power supply unit (second power supply) is at a relatively low level at the point in time that the starting switch is turned on. That is, the second power supply unit can recover from a low level state at an early stage after the starting switch has been turned on. When a predetermined condition has been established after starting the quick charging control, the quick charging control can be completed at an early stage and switched to the charging/discharging control that is resistant to a power interruption of the first power supply unit (first power supply) (a control in which, even if the power is interrupted, the discharging is maintained at that point in time).

The control unit may function so as to perform the charging/discharging control when at least a shift operation of the vehicle in which the power source device is mounted is performed after the starting switch has been turned on.

The vehicle power supply device is able to promptly increase the output voltage of the second power supply unit before the vehicle travels and the second power supply unit can be recovered at an earlier stage from a low level state because the quick charging control can be performed before the shift operation is performed. The control can at least be switched to the charging/discharging control after the shift operation has been performed. That is, after the possibility of the vehicle entering a traveling state has been established, the complete cutoff of power during traveling can be prevented by switching to a control that is resistant to a power interruption of the first power supply unit (a control in which, even when a power interruption occurs, discharging is maintained at that point in time).

The control unit may function so as to perform the charging/discharging control when at least a fixed time period has elapsed after the starting switch has been turned on.

During an initial stage after the starting switch has been turned on and before the fixed time period has elapsed, the vehicle power supply device is able to promptly increase the output voltage of the second power supply unit and cause the second power supply unit to recover from a low level state at an earlier stage because the quick charging control can be performed. After at least the fixed time period has elapsed, the control can be switched to the charging/discharging control that is resistant to a power interruption of the first power supply unit (a control in which, even if the power is interrupted, the discharging is maintained at that point in time).

The vehicle power supply device may have a switching unit (switch) provided with: a switch part that is disposed in the third conductive path, has one end electrically connected to the second voltage conversion unit (second voltage converter), has the other end electrically connected to the conductive path on the output side, and switches between on and off; and a diode that is provided in parallel to the switch part, has an anode electrically connected to the second voltage conversion unit, and a cathode electrically connected to the conductive path on the output side. The control unit may function so as to perform the quick charging control while the switch part is turned on, and perform the charging/discharging control while the switch part is turned off.

While performing the quick charging control, the vehicle power supply device is able to allow a current to flow to the second voltage conversion unit from the conductive path on the input side through the second conductive path and the third conductive path by turning on the switch part of the switching unit. Moreover, while performing the charging/discharging control, the vehicle power supply device allows a current output from the second voltage conversion unit to flow toward the conductive path on the output side due to the presence of the diode provided in parallel with the switch part, while interrupting the flow of the current from the conductive path on the input side, through the second conductive path and the third conductive path, to the second voltage conversion unit, by turning the switch part off.

The vehicle power supply device may be provided with an abnormality detection unit (abnormality detector) that detects at least an abnormality of the voltage or current of the conductive path on the input side. The control unit may function so as to perform a one-side discharging control in which operation of the first voltage conversion unit (first voltage converter) is stopped and the second voltage conversion unit is caused to perform a discharging operation when an abnormality is detected by the abnormality detection unit when the quick charging control or the charging/discharging control is being performed.

The control unit of the vehicle power supply device performs the one-side discharging control when the abnormality detection unit detects an abnormality while the quick charging control or the charging/discharging control is being performed. Due to the one-side discharging control, the operation of the first voltage conversion unit is stopped for protection and the second voltage conversion unit is caused to perform the discharging operation to maintain a power supply state. In particular, when the control is switched to the one-side discharging control when an abnormality occurs on the conductive path on the input side while the charging/discharging control is being performed, a situation is less likely to occur in which the power supply immediately after the occurrence of the abnormality is completely cutoff, because the discharging operation of the second voltage conversion unit can be continued before and after the abnormality.

The vehicle power supply device may have a second switching unit (second switch) for switching between on in which the flow of current between the conductive path on the input side and the third conductive path is allowed and off in which said flow is interrupted. The control unit may function so as to turn on the second switching unit when the control unit executes the quick charging control and the charging/discharging control, and may turn off the second switching unit when the control unit executes the one-side discharging control.

When performing the quick charging control, the vehicle power supply device turns on the second switching unit (state for allowing the flow of a current between the conductive path on the input side and the third conductive path) and enables the current to be supplied from the conductive path on the input side, through the second conductive path and the third conductive path, to the second voltage conversion unit. However, when the one-side discharging control is being performed in response to the occurrence of an abnormality, a charging current from the second voltage conversion unit can be prevented from mistakenly flowing into the conductive path on the input side where the abnormality has occurred because the second switching unit can be turned off.

The first voltage conversion unit may perform a charging operation for stepping up or stepping down the voltage applied to the first conductive path and outputting the output voltage to the conductive path on the second power supply unit side, and a discharging operation for stepping up or stepping down the voltage applied to the conductive path on the second power supply unit side and outputting the voltage to the first conductive path. The control unit may function so as to at least perform a quick discharging control for causing the second voltage conversion unit to perform the discharging operation while causing the first voltage conversion unit to perform the discharging operation.

The vehicle power supply device is able to cause either of the first voltage conversion unit and the second voltage conversion unit to perform the discharging operation as needed which is advantageous when it is desirable to increase the discharging capacity of the second power supply unit.

The vehicle power supply device may have a voltage detection unit for detecting the output voltage of the second power supply unit. The control unit may function so as to perform the quick discharging control when at least the output voltage of the second power supply unit detected by the voltage detection unit is equal to or less than a fixed value.

The second power supply unit may be used until a low voltage range if the quick discharging control is performed when the output voltage of the second power supply unit is reduced. Consequently, the voltage range in which use of the second power supply unit is possible can be widened.

The vehicle power supply device may have a plurality of the first conductive paths that branch off from the conductive path on the input side. Further, a multiphase configuration may be formed in which a plurality of the first voltage conversion units are provided in parallel between the respective first conductive paths and the conductive path on the second power supply unit side.

The vehicle power supply device is able to improve the charging capacity because the multiphase configuration is formed in which a plurality of the first voltage conversion units are provided in parallel.

The vehicle power supply device may have a plurality of the third conductive paths. Further, a multiphase configuration may be formed in which a plurality of the second voltage conversion units are provided in parallel between the conductive path on the second power supply unit side and the respective third conductive paths.

The vehicle power supply device is able to improve the discharging capacity because the multiphase configuration is formed in which a plurality of the second voltage conversion units are provided in parallel. In addition, even if an open fault or the like occurs in any of the second voltage conversion units during the charging/discharging control, the power supply can be easily maintained by means of a discharging operation using another second voltage conversion unit.

First Embodiment

A first embodiment that embodies the present disclosure is explained below.

A vehicle power supply system 100 shown in FIG. 1 is provided with a first power supply unit 3, a second power supply unit 5, and a vehicle power supply device 1 (may be referred to hereinbelow as power supply device 1), and is configured as a system that can supply power to a load. The second power supply unit 5 may be configured as a portion of the power supply device 1 or may be provided as a member separate from the power supply device 1. In the following explanation, an example in which the second power supply unit 5 is configured as a portion of the power supply device 1 will be explained as a representative example.

The first power supply unit 3 is, for example, configured by a well-known power storage means such as a lead storage battery. The first power supply unit 3 generates a predetermined voltage and applies the predetermined voltage to a conductive path 14 on the input side. A terminal on the high potential side of the first power supply unit 3 is electrically connected to the conductive path 14 on the input side that forms a power pathway from the first power supply unit 3, and a terminal on the low potential side of the first power supply unit 3 is electrically connected to a ground.

The second power supply unit 5 is configured, for example, by a well-known power storage means such as an electric double layer capacitor. The second power supply unit 5 is, for example, configured as a capacitor group in which a plurality of capacitors are connected in series, and a terminal that serves as the lowest potential in the entirety is electrically connected to a ground via a current detection resistance (a resistor 82A). In addition, a terminal that serves as the highest potential in the second power supply unit 5 is electrically connected to a conductive path 24 on the second power supply unit side.

The power supply device 1 is mainly provided with: a first voltage conversion unit 40; a second voltage conversion unit 50; a control unit 60; a first conductive path 21; a second conductive path 22; a third conductive path 23; the conductive path 24 on the second power supply unit side; the second power supply unit 5; semiconductor switches 71, 72, 73; and current detection circuits 81, 82, 83, etc. The above elements are provided as an integrated unit on a substrate which is not illustrated.

The power supply device 1 is configured as a circuit that generates an output voltage to be applied to a conductive path 16 on the output side, based on the voltage applied to the conductive path 14 on the input side by the first power supply unit 3, and as a circuit that generates an output voltage to be applied to the conductive path 16 on the output side based on the voltage applied to the conductive path 24 on the second power supply unit side by the second power supply unit 5 when the voltage applied to the conductive path 14 on the input side has fallen below a fixed level. Within the wiring that forms the conductive path 14 on the input side in FIG. 1, the wiring that is provided on the substrate that configures the power supply device 1 is referred to as the conductive path 14B, and the wiring that is provided outside of the power supply device 1 is referred to as the conductive path 14A. In addition, within the wiring that forms the conductive path 16 on the output side, the wiring that is provided on the substrate that configures the power supply device 1 is referred to as the conductive path 16B, and the wiring that is provided outside of the power supply device 1 is referred to as the conductive path 16A.

The power supply device 1 is provided with the first conductive path 21 and the second conductive path 22 that branch off from the conductive path 14 on the input side, and the third conductive path 23 and the conductive path 16B that branch off from the second conductive path 22.

The first conductive path 21 is a conductive path that connects the conductive path 14 on the input side and the first voltage conversion unit 40. The first conductive path 21 functions as a pathway for applying the voltage of the conductive path 14 on the input side to a drain of a switching element 41 so that the voltage of the conductive path 14 on the input side becomes the input voltage of the first voltage conversion unit 40 during a step-down operation of the first voltage conversion unit 40. In addition, the first conductive path 21 functions as a pathway for transmitting the output voltage so that the output voltage of the first voltage conversion unit 40 is applied to the second conductive path 22 during a step-up operation of the first voltage conversion unit 40.

The second conductive path 22 branches off from the conductive path 14 on the input side as a pathway different from the first conductive path 21, and is electrically connected to the conductive path 16B (a portion of the conductive path 16 on the output side) and the third conductive path 23. The second conductive path 22 functions as a conductive path for connecting the conductive path 14 on the input side with the conductive path 16 on the output side and the third conductive path 23.

The third conductive path 23 is a conductive path for connecting the second conductive path 22 and the conductive path 16 on the output side with the second voltage conversion unit 50, and functions as a pathway for applying, to a drain of a switching element 51, an input voltage based on the voltage of the second conductive path 22 during a step-down operation of the second voltage conversion unit 50. In addition, the third conductive path 23 functions as a pathway for transmitting the output voltage so that the voltage based on the output voltage of the second voltage conversion unit 50 is applied to the conductive path 16 on the output side during a step-up operation of the second voltage conversion unit 50.

The conductive path 24 side (fourth conductive path) of the second power supply unit is a conductive path for connecting an inductor 43 of the first voltage conversion unit 40, and an inductor 53 of the second voltage conversion unit 50, and a terminal on the high potential side of the second power supply unit 5, and is a conductive path to which the output voltage (charging voltage) of the second power supply unit 5 is applied.

The semiconductor switches 71 and 72 are configured, for example, as N-channel MOSFETs. The semiconductor switches 71 and 72 correspond to an example of a second switching unit, and function so as to switch between on, in which the current between the conductive path 14 on the input side and the third conductive path 23 is allowed to flow, and off, in which said current is interrupted. Specifically, if the semiconductor switches 71 and 72 are both on, energization between the conductive path 14 on the input side and the third conductive path 23 is possible, and if the semiconductor switches 71 and 72 are both off, energization between the conductive path 14 on the input side and the third conductive path 23 is not possible. The drain of the semiconductor switch 71 is electrically connected to the first power supply unit 3 via the conductive path 14B that forms a portion of the conductive path 14 on the input side, and the source of the semiconductor switch 71 is electrically connected to the first conductive path 21 and the second conductive path 22. When the semiconductor switch 71 is off, the flow of the current from the first conductive path 21 and the second conductive path 22 toward the first power supply unit 3 is interrupted. When the semiconductor switch 71 is on, energization in both directions along the conductive path 14B is allowed. The drain of the semiconductor switch 72 is electrically connected to the conductive path 16 on the output side and the third conductive path 23, and the source of the semiconductor switch 72 is electrically connected to the first conductive path 21 and the second conductive path 22. When the semiconductor switch 72 is off, the flow of the current from the conductive path 14 on the input side and the first conductive path 21 to the conductive path 16 on the output side and the third conductive path 23 is interrupted. When the semiconductor switch 72 is on, energization in both directions along the second conductive path 22 is allowed.

The semiconductor switch 73 is configured, for example, as an N-channel MOSFET. The semiconductor switch 73 corresponds to an example of a switching unit, and switches between on, in which energization in both directions of the third conductive path 23 is allowed, and off, in which energization in the direction toward the second voltage conversion unit 50 along the third conductive path 23 is interrupted. A portion of the semiconductor switch 73 excluding a body diode 73A (also referred to below as a diode 73A) is a switch part 73B. The switch part 73B is disposed in the third conductive path 23 and one end of the switch part 73B is electrically connected to the second voltage conversion unit 50, the other end thereof is electrically connected to the conductive path 16 on the output side, and the switch part 73B is switched between on and off. When the switch part 73B is on, energization in both directions along the third conductive path 23 is allowed. The diode 73A is provided in parallel to the switch part 73B, and the anode of the diode 73A is electrically connected to the second voltage conversion unit 50, and the cathode thereof is electrically connected to the conductive path 16 on the output side.

The first voltage conversion unit 40 is a synchronous rectification-type single phase DCDC converter and is provided between the first conductive path 21 and the conductive path 24 on the second power supply unit side. The first voltage conversion unit 40 functions as a step-up/step-down bidirectional DCDC converter having the function of using the voltage applied to the first conductive path 21 as an input voltage and stepping down and outputting said input voltage to the conductive path 24 on the second power supply unit side and connected to the second power supply unit 5 (function for performing a charging operation), and the function of using the voltage applied to the conductive path 24 on the second power supply unit as an input voltage, and stepping up and outputting said input voltage to the first conductive path 21 (function for performing a discharging operation).

The first voltage conversion unit 40 is provided with the switching element 41 on the high side and a switching element 42 on the low side, both of which are configured as N-channel MOSFETs, the inductor 43, and a capacitor 44. The switching element 41 and the switching element 42 are connected in series between the first conductive path 21 and a ground, and the drain of the switching element 41 is connected to the first conductive path 21 and receives the application of the voltage of the first conductive path 21. The source of the switching element 41 is connected to the drain of the switching element 42 on the low side and to one end of the inductor 43. The source of the switching element 42 is connected to the ground via a resistor 83A. Drive signals (on-signals) and non-drive signals (off-signals) are inputted to the gate of the switching element 41 by means of PWM signals from a drive circuit provided in the control unit 60, and the switching element 41 is switched between on and off in response to the signals from the drive circuit. Similarly, drive signals (on-signals) and non-drive signals (off-signals) are inputted to the gate of the switching element 42 by means of the PWM signals from the drive circuit, and the switching element 42 is switched between on and off in response to the signals from the drive circuit.

The drive circuit provided in the control unit 60 applies, to the gates of the switching elements 41 and 42, on-signals for alternately turning on the switching elements 41 and 42 according to the respective control periods. On-signals whose phases are substantially inverted from those of the on-signals applied to the gate of the switching element 42 and for which a so-called dead time is assured, are applied to the gate of the switching element 41.

The second voltage conversion unit 50 is a synchronous rectification-type single phase DCDC converter and is provided between the third conductive path 23 and the conductive path 24 on the second power supply unit side. The second voltage conversion unit 50 functions as a step-up/step-down bidirectional DCDC converter having the function of using the voltage applied to the third conductive path 23 as an input voltage and stepping down and outputting said input voltage to the conductive path 24 on the second power supply unit side (function for performing a charging operation), and the function of using the voltage applied to the conductive path 24 on the second power supply unit as an input voltage, and stepping up and outputting said input voltage to the third conductive path 23 (function for performing a discharging operation).

The second voltage conversion unit 50 is provided with a switching element 51 on the high side and a switching element 52 on the low side, both of which are configured as N-channel MOSFETs, the inductor 53, and a capacitor 54. The switching element 51 and the switching element 52 are connected in series between the third conductive path 23 and a ground. The drain of the switching element 51 is connected to the third conductive path 23 and receives the application of the voltage of the third conductive path 23. The source of the switching element 51 is connected to the drain of the switching element 52 on the low side and to one end of the inductor 53. The source of the switching element 52 is connected to the ground via the resistor 83A. Drive signals (on-signals) and non-drive signals (off-signals) are inputted to the gate of the switching element 51 by means of the PWM signals from the drive circuit provided in the control unit 60, and the switching element 51 is switched between on and off in response to the signals from the drive circuit. Similarly, drive signals (on-signals) and non-drive signals (off-signals) are inputted to the gate of the switching element 52 by means of the PWM signals from the drive circuit, and the switching element 52 is switched between on and off in response to the signals from the drive circuit.

The drive circuit provided in the control unit 60 applies, to the gates of the switching elements 51 and 52, on-signals for alternately turning on the switching elements 51 and 52 according to the respective control periods. On-signals whose phases are substantially inverted from those of the on-signals applied to the gate of the switching element 52 and for which a so-called dead time is assured, are applied to the gate of the switching element 51.

The control unit 60 is provided with a control circuit that is configured, for example, as a microcomputer, and the drive circuit for outputting the PWM signals to the switching elements 41, 42, 51, and 52 on the basis of the PWM signals issued by the control circuit. The control circuit provided in the control unit 60 is provided with: a CPU that can perform various operations; a ROM for storing information such as programs; a RAM for storing temporarily generated information; and an A/D converter for converting an analog voltage to a digital value. The CPU is connected by a bus to the ROM, the RAM, and the A/D converter.

The current detection circuit 81 has a resistor 81A and a differential amplifier 81B. A voltage drop produced by the resistor 81A is amplified by the differential amplifier 81B and becomes a detection voltage that corresponds to an output current, and is converted to a digital value by the A/D converter. The current detection circuit 82 has a resistor 82A and a differential amplifier 82B. A voltage drop produced by the resistor 82A is amplified by the differential amplifier 82B and becomes a detection voltage that corresponds to an output current, and is converted to a digital value by the A/D converter. The current detection circuit 83 has the resistor 83A and a differential amplifier 83B. A voltage drop produced by the resistor 83A is amplified by the differential amplifier 83B and becomes a detection voltage that corresponds to an output current, and is converted to a digital value by the A/D converter.

The detection voltages from the current detection circuits 81 to 83 are inputted to an A/D converter in the control unit 60, and the voltages thereof are changed to digital values by the A/D converter, whereby the control circuit in the control unit 60 is able to detect the currents at the positions where the resistors 81A, 82A, and 83A are provided. In addition, the respective voltages of the conductive path 14 on the input side, the conductive path 24 on the second power supply unit side, and the third conductive path 23 are inputted to the A/D converter in the control unit 60, and the respective voltages are changed to digital values by the A/D converter whereby the control circuit in the control unit 60 is able to detect the voltages of the respective positions. While the example of FIG. 1 illustrates an example configuration in which the respective voltages of the conductive path 14 on the input side, the conductive path 24 on the second power supply unit side, and the third conductive path 23 are input directly to the control unit 60, a voltage divider circuit may be provided for dividing the respective voltages of the conductive path 14 on the input side, the conductive path 24 on the second power supply unit side, and the third conductive path 23, and the divided voltages of the respective voltages may be inputted to the control unit 60.

The control unit 60 causes the first voltage conversion unit 40 to function as a synchronous rectification step-up/step-down converter, and when performing a step-down operation, the control unit 60 synchronizes the switching of the on- and off-operations of the switching element 42 on the low side with the operations of the switching element 41 on the high side, whereby a direct current voltage applied to the first conductive path 21 is stepped down and outputted to the conductive path 24 on the second power supply unit side. The output voltage of the conductive path 24 on the second power supply unit side is determined in accordance with the duty ratio of the PWM signals applied to the gate of the switching element 41. When performing a step-down operation, the control unit 60 performs a feedback operation using a well-known feedback operation method (for example, a PID operation method) and adjusts the duty of the PWM signals so that the output voltage approaches a predetermined target voltage on the basis of a deviation between the output voltage applied to the conductive path 24 on the second power supply unit side and the target voltage.

When performing a step-up operation with the first voltage conversion unit 40, the control unit 60 performs a feedback operation using a well-known feedback operation method (for example, a PID operation method) and adjusts the duty of the PWM signals so that the output voltage approaches a predetermined target voltage on the basis of a deviation between the output voltage applied to the first conductive path 21 and the target voltage.

In addition, the control unit 60 causes the second voltage conversion unit 50 to function as a synchronous rectification step-up/step-down converter, and when performing a step-down operation, the control unit 60 synchronizes the switching of the on- and off-operations of the switching element 52 on the low side with the operations of the switching element 51 on the high side, whereby a direct current voltage applied to the third conductive path 23 is stepped down and outputted to the conductive path 24 on the second power supply unit side. The output voltage of the conductive path 24 on the second power supply unit side is determined in accordance with the duty ratio of the PWM signals applied to the gate of the switching element 51. When performing a step-up operation, the control unit 60 performs a feedback operation using a well-known feedback operation method (for example, a PID operation method) and adjusts the duty of the PWM signals so that the output voltage approaches a predetermined target voltage on the basis of a deviation between the output voltage applied to the conductive path 24 on the second power supply unit side and the target voltage.

When performing a step-up operation with the second voltage conversion unit 50, the control unit 60 performs a feedback operation using a well-known feedback operation method (for example, a PID operation method) and adjusts the duty of the PWM signals so that the output voltage approaches a predetermined target voltage on the basis of a deviation between the output voltage applied to the third conductive path 23 and the target voltage.

The methods for setting the proportional gain, the derivative gain, and the integration gain are not limited when performing the feedback operation with the PID method, and any setting method may be used.

In the present configuration, the control unit 60 is able to perform at least four controls: the quick charging control, the charging/discharging control, the one-side discharging control, and the quick discharging control. The quick charging control is a control for causing the first voltage conversion unit 40 to perform a charging operation and causing the second voltage conversion unit 50 to perform a charging operation. The charging/discharging control is a control for causing the first voltage conversion unit 40 to perform a charging operation and causing the second voltage conversion unit 50 to perform a discharging operation. The one-side discharging control is a control for stopping the charging operation of the first voltage conversion unit 40 and causing the second voltage conversion unit 50 to perform a discharging operation. The quick discharging control is a control for causing the first voltage conversion unit 40 to perform a discharging operation and causing the second voltage conversion unit 50 to perform a discharging operation.

Next, a flow of the specific controls executed by the power supply device 1 will be explained.

Figure 2:
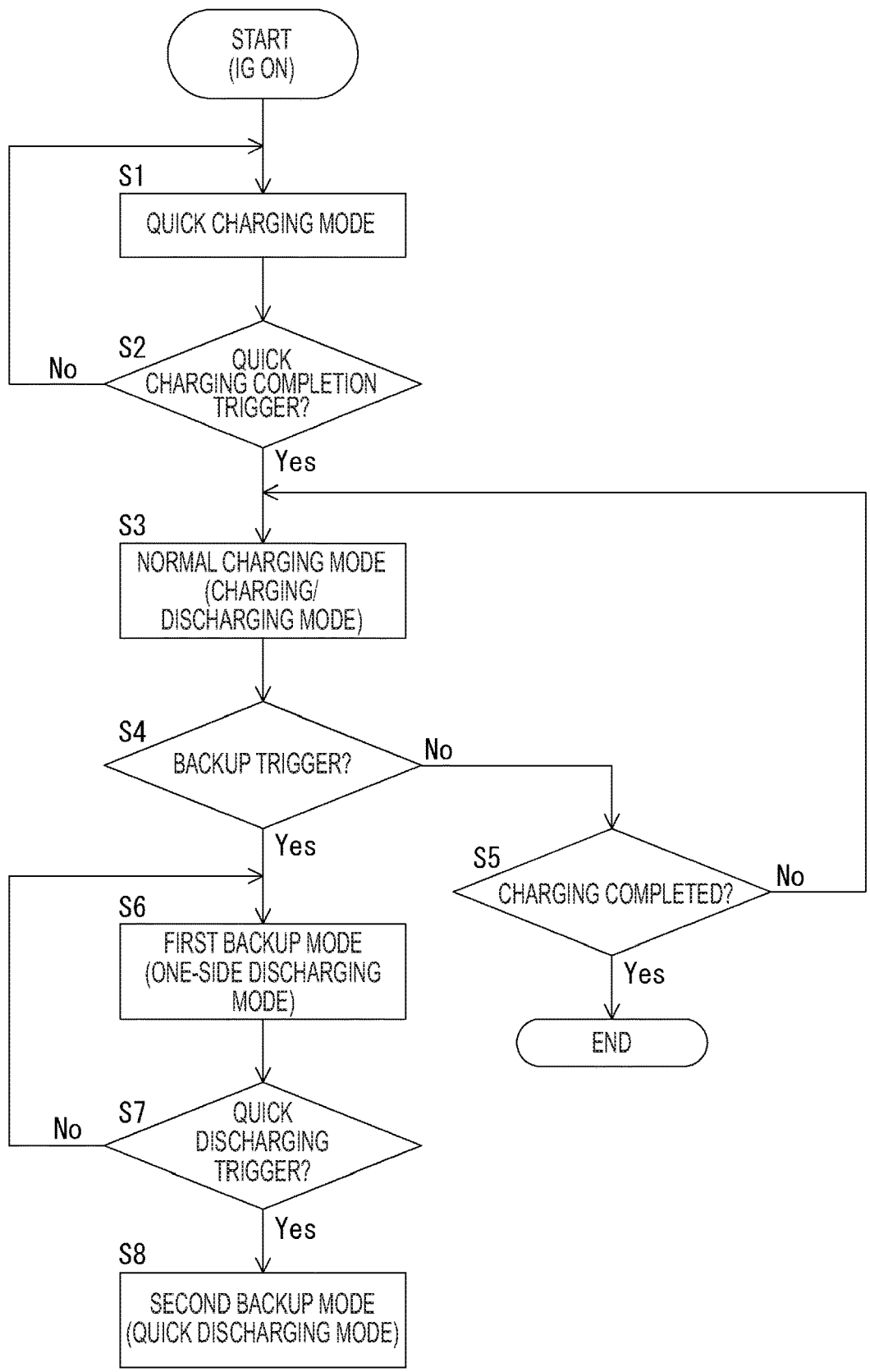
FIG. 2 is a flow chart showing a charging control flow performed after the ignition is turned on in the vehicle power supply device according to the first embodiment.

The control described in FIG. 2 is, for example, a process that is executed when a starting switch is turned on for switching a vehicle in which the power supply device 1 is mounted to a state in which travel is possible. Specifically, when an unillustrated ignition switch provided in a vehicle is switched from on to off, an ignition on-signal (may be referred to below as IG on-signal) which indicates that the ignition switch has been turned on is input into the control unit 60 from a device (an external ECU or the like) provided outside of the power supply device 1. When the ignition switch is turned off, an ignition off-signal (may be referred to below as IG off-signal) which indicates that the ignition switch has been turned off is input into the control unit 60. That is, the ignition switch corresponds to an example of the starting switch, and the case of the ignition switch being turned on corresponds to an example of "when the starting switch is turned on."

Figure 3:
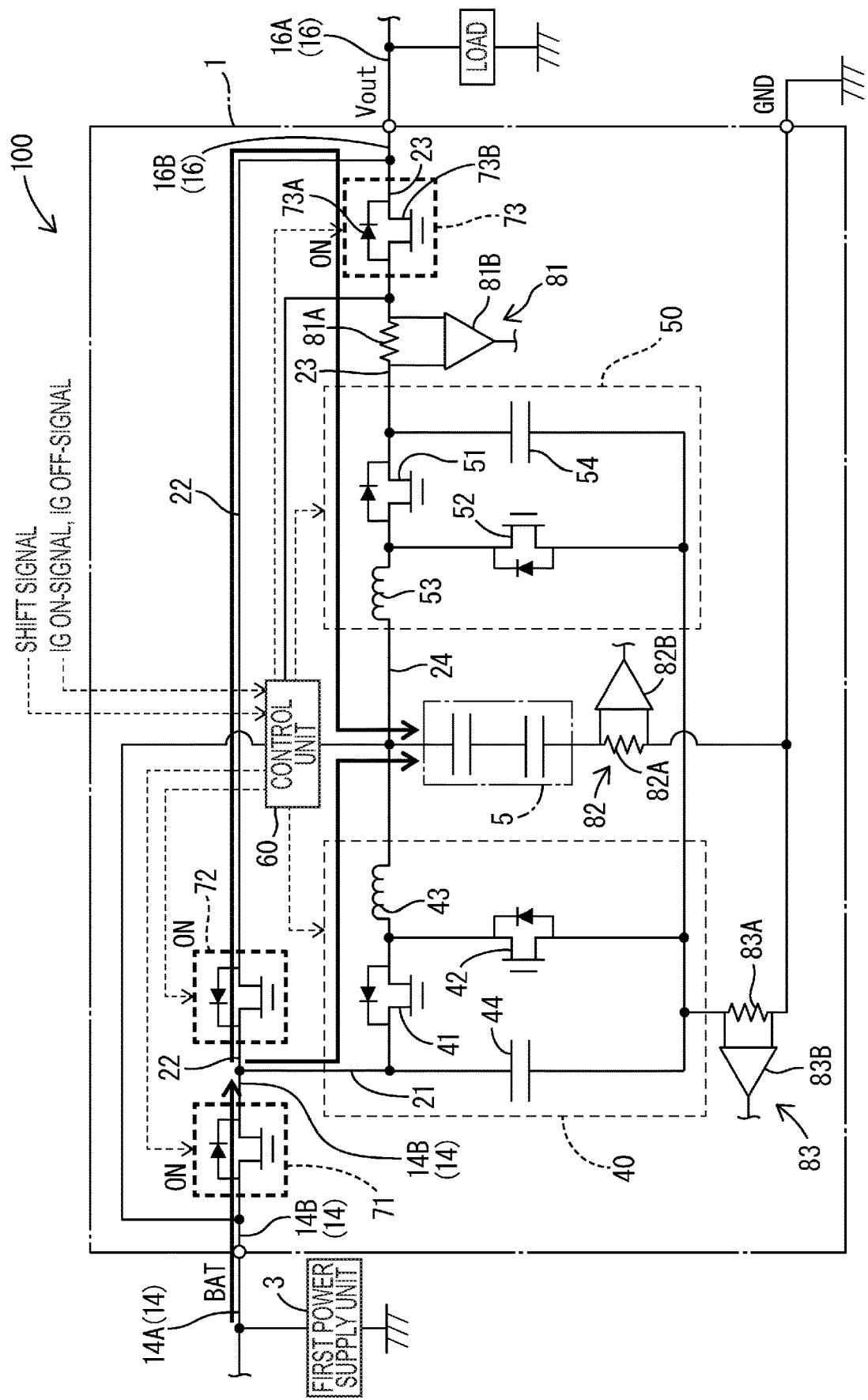
FIG. 3 is a diagram for explaining an operating state during a quick charging control of the vehicle power supply device according to the first embodiment.

The control unit 60 first executes the processing of step S1 and sets the mode for operating the power supply device 1 to a quick charging mode when the control in FIG. 2 is started in response to the ignition switch being turned on. The quick charging mode is a mode for the control unit 60 to perform the quick charging control. During the quick charging control, the control unit 60 keeps the semiconductor switches 71 and 72 on and keeps the semiconductor switch 73 on. While the switches are on, both the first voltage conversion unit 40 and the second voltage conversion unit 50 are caused to perform the charging operation for supplying a charging current to the second power supply unit 5 as illustrated in FIG. 3. Specifically, the first voltage conversion unit 40 is caused to perform a step-down operation so as to step-down the voltage of the first conductive path 21 and output the voltage to the conductive path 24 of the second power supply unit side, and the second voltage conversion unit 50 is caused to perform a step-down operation so as to step-down the voltage of the third conductive path 23 and output the voltage to the conductive path 24 of the second power supply unit side. During the quick charging control in this way, a charging current is supplied to the second power supply unit 5 by the first voltage conversion unit 40 and the second voltage conversion unit 50 and a relatively large charging current is supplied, whereby the raising speed of the charging voltage is increased.

In this way, the control unit 60 performs the quick charging control when the starting switch (specifically, the ignition switch) for switching the vehicle in which the power supply device 1 is mounted to a state in which travel is possible, and the quick charging control is continued until a predetermined completion condition is established (until a quick charging completion trigger is reached).

The control unit 60 sets the quick charging mode in step S1, and after the quick charging control has started, determines whether the predetermined completion condition has been established (whether the quick charging completion trigger has been reached) in step S2. In the present configuration, the "predetermined completion condition" is determined when a shift operation is performed in the vehicle in which the power supply device 1 is mounted, or when a fixed time period has elapsed since the ignition switch (starting switch) has been turned on. When the control unit 60 determines that the completion condition has not been established in step S2, namely, when a shift operation has not been performed in the vehicle in which the power supply device 1 is mounted, or when the fixed time period has not elapsed since the ignition switch (starting switch) has been turned on (No in step S2), the control unit 60 continues the quick charging mode in step S1.

When the control unit 60 determines that the completion condition has been established in the processing step S2, namely when a shift operation has been performed in the vehicle in which the power supply device 1 is mounted, or when the fixed time period has elapsed since the ignition switch (starting switch) has been turned on (Yes in step S2), the control unit 60 performs the processing in step S3 and switches the mode from the quick charging mode to normal charging mode (charging/discharging mode). That is, the control unit 60 performs the charging/discharging control when a shift operation has been performed in the vehicle in which the power supply device 1 is mounted after the ignition switch (starting switch) has been turned on, or when the fixed time period has elapsed after the starting switch was turned on.

In the present configuration, a signal indicating a shift range is input to the power supply device 1 from an external device (for example, a shift-by-wire ECU or the like) provided outside of the power supply device 1, and the feature of "when a signal indicating a new shift range is input to the power supply device 1 after the ignition switch has been turned on" corresponds to an example of "when a shift operation has occurred." For example, a P-range signal indicating that the shift range has entered a P-range immediately after the ignition switch has been turned on, is input to the power supply device 1, and the control unit 60 determines that a shift operation has occurred when a D-range signal which indicates that the shift range has entered a D-range before the fixed time period from when the ignition switch (starting switch) has been turned on, has elapsed. The routine then advances to Yes in step S2.

Figure 4:
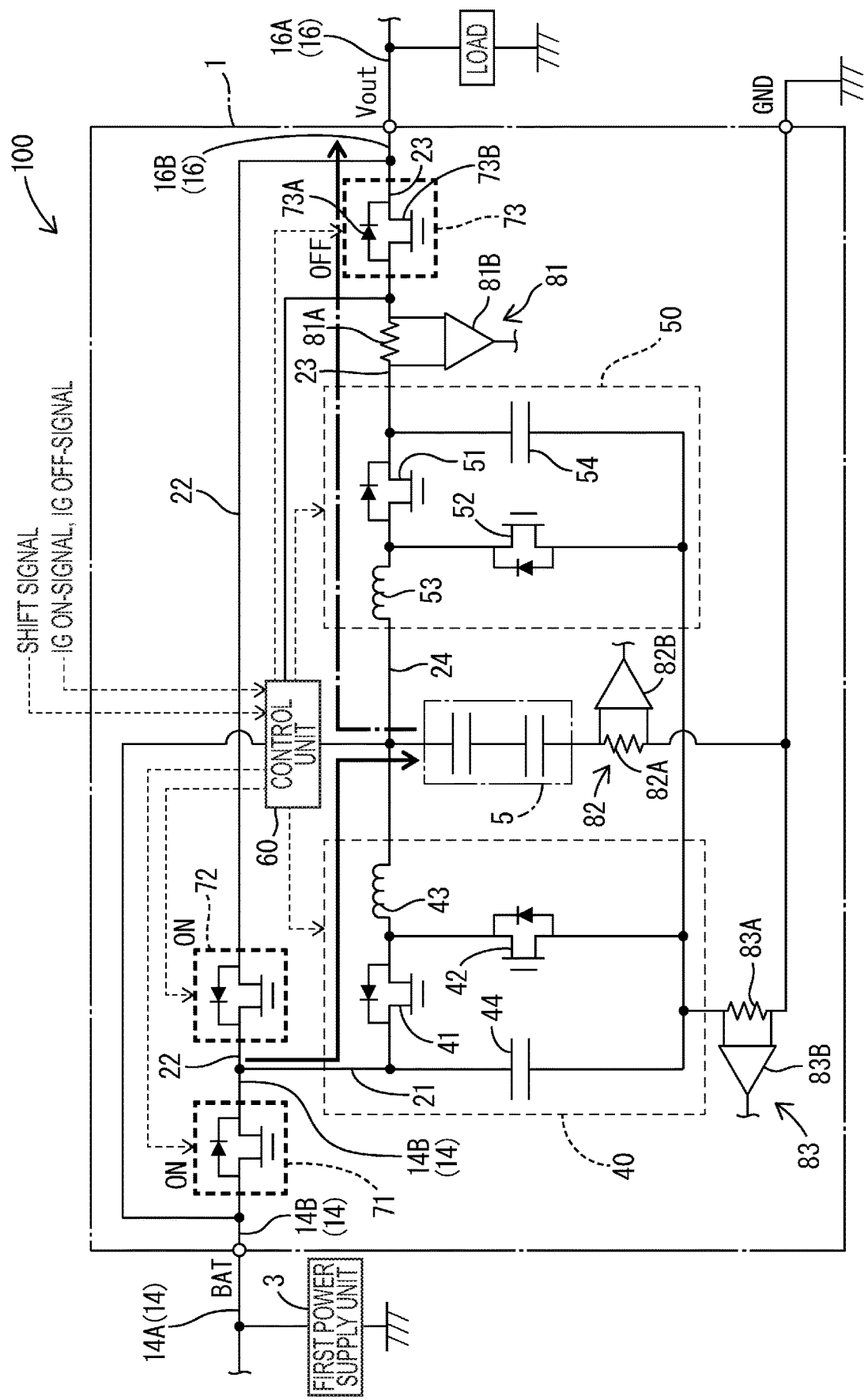
FIG. 4 is a diagram for explaining an operating state during a charging/discharging control of the vehicle power supply device according to the first embodiment.

The normal charging mode (charging/discharging mode) set in step S3 is a mode in which the control unit 60 performs the charging/discharging control. The control unit 60 keeps both of the semiconductor switches 71 and 72 on, and switches the semiconductor switch 73 off during the normal charging mode (charging/discharging mode). According to the above switch conditions, the first voltage conversion unit 40 is caused to perform the charging operation (step-down operation) for supplying the charging current to the second power supply unit 5, and the second voltage conversion unit 50 is caused to perform the discharging operation (step-up operation) in which the discharging current flows as illustrated in FIG. 4. Specifically, the first voltage conversion unit 40 is caused to perform a step-down operation so as to step-down the voltage of the first conductive path 21 and output the voltage to the conductive path 24 of the second power supply unit side, and the second voltage conversion unit 50 is caused to perform a step-up operation so as to step-up the voltage of the conductive path 24 of the second power supply unit side and output the voltage to the third conductive path 23.

When the control unit 60 performs the quick charging control as illustrated in FIG. 3, the semiconductor switch 73 is kept on (that is, the switch part 73B is on). However, when the control unit 60 performs the charging/discharging control as illustrated in FIG. 4, the semiconductor switch 73 is kept off (that is, the switch part 73B is off). Specifically, during the charging/discharging control, the flow of the current toward the second voltage conversion unit 50 from the second conductive path 22 through the third conductive path 23 is interrupted, and the current output from the second voltage conversion unit 50 to the third conductive path 23 flows through the body diode 73A to the conductive path 16 on the output side.

After the control unit 60 sets the mode to the normal charging mode (charging/discharging mode) in step S3, the control unit 60 determines whether a backup trigger has been reached (specifically, whether an abnormality of the power supply from the conductive path 14 on the input side has occurred) in step S4. According to the present configuration, the voltage of the conductive path 14 on the input side is input to the control unit 60, and the control unit 60 monitors the voltage of the conductive path 14 on the input side. The control unit 60 determines in step S4 whether the voltage of the conductive path 14 on the input side is equal to or less than a first threshold voltage. If the voltage of the conductive path 14 on the input side is equal to or less than the first threshold voltage (when it is determined that the backup trigger has occurred, Yes in step S4), the processing in step S6 is performed.

When the control unit 60 determines in step S4 that the voltage of the conductive path 14 on the input side has exceeded the first threshold voltage (the control unit 60 determines that the backup trigger has not occurred, No in step S4), the control unit 60 determines whether a charging completion condition has been established (for example, whether the charging voltage of the second power supply unit 5 has reached a charging threshold voltage) in step S5. When the control unit 60 determines in step S5 that the charging completion condition has not been established (No in step S5), the control unit 60 performs the processing from step S3 onward.

When the control unit 60 determines in step S5 that the charging completion condition has been established (Yes in step S5), the control unit 60 completes the abovementioned charging/discharging control (FIG. 4) and stops the operations of the first voltage conversion unit 40 and the second voltage conversion unit 50. In this case, after the charging/discharging control has been completed, for example, the semiconductor switch 73 is kept off while the semiconductor switches 71 and 72 are kept on.

Figure 5:
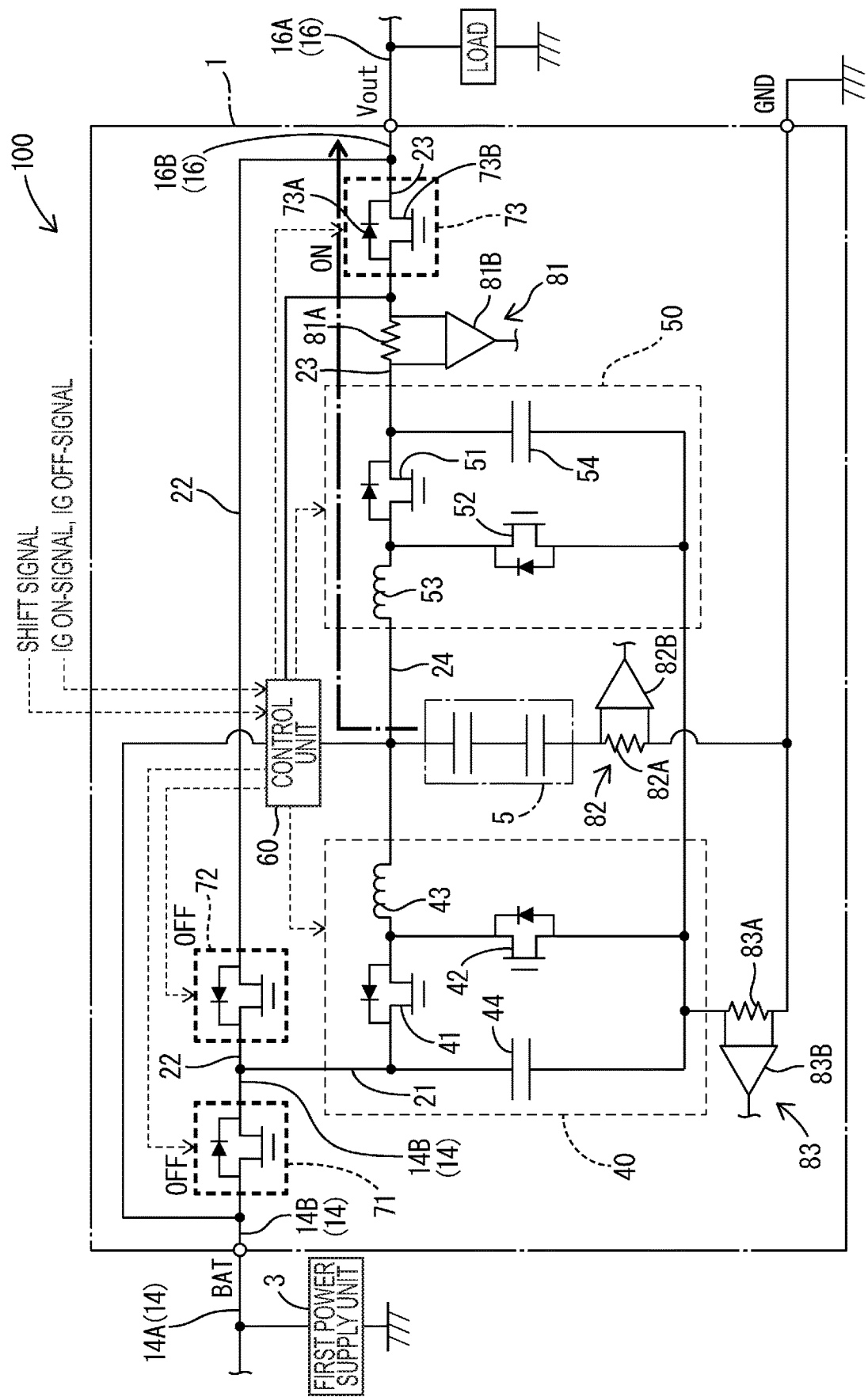
FIG. 5 is a diagram for explaining an operating state during a one-side discharging control of the vehicle power supply device according to the first embodiment.

When the control unit 60 determines in step S4 that the voltage of the conductive path 14 on the input side is equal to or less than the first threshold voltage and performs the processing in step S6, the control unit 60 sets the mode to a first backup mode (one-side discharging mode). The first backup mode (one-side discharging mode) is a mode for the control unit 60 to perform the one-side discharging control. The control unit 60 keeps both of the semiconductor switches 71 and 72 off and keeps the semiconductor switch 73 on when performing the one-side discharging control. As a result, the flow of the current from the first conductive path 21 and the second conductive path 22 toward the conductive path 14 on the input side is interrupted, and the flow of the current from the conductive path 14 on the input side and the first conductive path 21 toward the conductive path 16 on the output side is also interrupted. According to the above switch conditions, the operation of the first voltage conversion unit 40 is stopped and the second voltage conversion unit 50 is caused to perform the discharging operation (step-up operation) in which a discharging current flows as illustrated in FIG. 5. Specifically, the second voltage conversion unit 50 is caused to perform the step-up operation so that the switching elements 41 and 42 of the first voltage conversion unit 40 are kept off and the voltage of the conductive path 24 on the second power supply unit side is stepped-up and output to the third conductive path 23.

In this way, even if a voltage drop of the conductive path 14 on the input side occurs due to a ground fault or disconnection and the like while the second power supply unit 5 is being charged with the abovementioned charging/discharging control, the second power supply unit 5 can be caused to operate as a backup power supply by performing the one-side discharging control. Moreover, because the discharging by the second voltage conversion unit 50 can be maintained without interruption before and after the control unit 60 switches the control from the charging/discharging control to the one-side discharging control, it is less likely that a blank period in which the power is interrupted will occur in a period from the detection of the abnormality in the conductive path 14 on the input side until the backup operation is performed.

According to the present configuration, the control unit 60 corresponds to an example of the abnormality detection unit and has at least a function for detecting an abnormality (specifically, an abnormality in which the voltage of the conductive path 14 on the input side falls to the first threshold voltage or lower) of the voltage of the conductive path 14 on the input side. When the control unit 60 then detects that there is an abnormality while the charging/discharging control is being performed due to the mode setting in step S3, the mode is switched to the first backup mode in step S6 and the one-side discharging control is performed in which the operation of the first voltage conversion unit 40 is stopped and the second voltage conversion unit 50 is caused to perform the discharging operation.

After the first backup mode (one-side discharging mode) has been set in step S6, the control unit 60 determines in step S7 whether a quick discharging trigger has been reached (specifically, whether the output voltage of the second power supply unit 5 has dropped to a level equal to or below a second threshold voltage). According to this configuration, the voltage of the conductive path 24 on the second power supply unit side is input to the control unit 60 and the control unit 60 monitors the voltage of the conductive path 24 on the second power supply unit side. The control unit 60 determines in step S7 whether the voltage of the conductive path 24 on the second power supply unit side has dropped to a level equal to or below the second threshold voltage, and if it is determined that the voltage of the conductive path 24 on the second power supply unit side is equal to or less than the second threshold voltage (it is determined that the quick discharging trigger has occurred, Yes in step S7), the control unit 60 performs the processing in step S8. However, if the control unit 60 determines that the voltage of the conductive path 24 on the second power supply unit side is not equal to or less than the second threshold voltage (No in step S7), the control unit 60 maintains the setting in step S6 (the first backup mode setting) and continues the abovementioned one-side discharging control.

Figure 6:
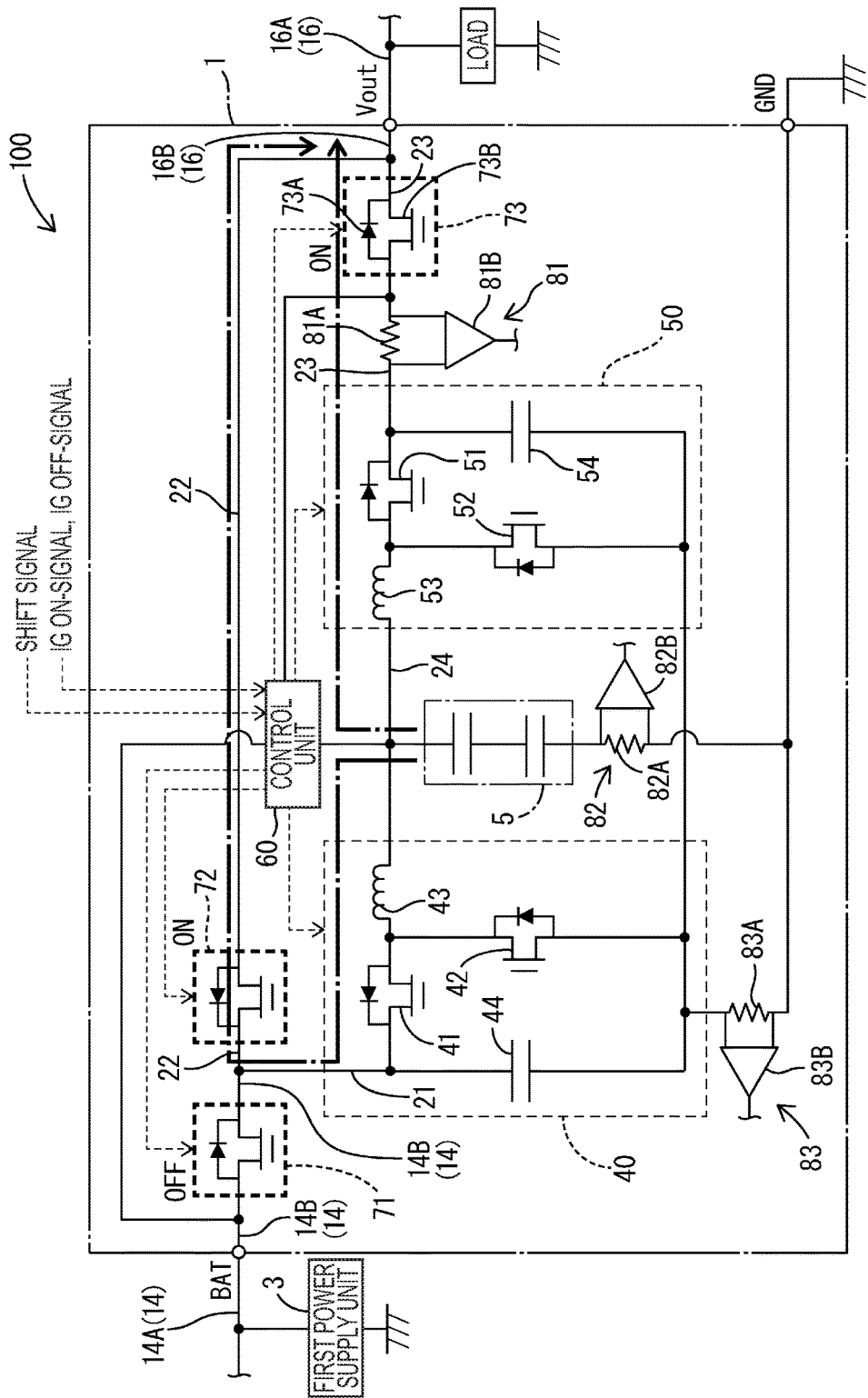
FIG. 6 is a diagram for explaining an operating state during a quick discharging control of the vehicle power supply device according to the first embodiment.

When the control unit 60 determines in step S7 that the voltage of the conductive path 24 on the second power supply unit side is equal to or less than the second threshold voltage, the control unit 60 establishes a second backup mode (quick discharging mode) in step S8. The second backup mode (quick discharging mode) is a mode for the control unit 60 to perform the quick discharging control. When performing the quick discharging control, the control unit 60 turns off the semiconductor switch 71 and keeps both of the semiconductor switches 72 and 73 on. As a result, the flow of the current from the first conductive path 21 and the second conductive path 22 toward the conductive path 14 on the input side is interrupted, and a conductive state is established between the first conductive path 21 and the conductive path 16 on the output side. According to the above switch conditions, the first voltage conversion unit 40 and the second voltage conversion unit 50 are caused to perform the discharging operation (step-up operation) in which a discharging current flows as illustrated in FIG. 6. Specifically, the first voltage conversion unit 40 is caused to perform a step-up operation so as to step-up the voltage of the conductive path 24 on the second power supply unit side and output the voltage to the first conductive path 21, and the second voltage conversion unit 50 is caused to perform a step-up operation so as to step-up the voltage of the conductive path 24 of the second power supply unit side and output the voltage to the third conductive path 23.

According to the present configuration, the control unit 60 corresponds to an example of a voltage detection unit and functions so as to detect the output voltage of the second power supply unit 5. The control unit 60 functions so as to perform at least the quick discharging control when the output voltage of the second power supply unit 5 detected by the voltage detection unit is equal to or less than a fixed value.

Although omitted in FIG. 2, it is continuously determined that the voltage of the conductive path 14 on the input side is equal to or less than the first threshold voltage during the quick charging mode (that is, while the quick charging control is being performed) under the controls in FIG. 2, and when it is determined that the voltage of the conductive path 14 on the input side is equal to or less than the first threshold voltage, the processing from step S6 onward may be performed. Although omitted in FIG. 2, when it is determined that the charging is completed in step S5 and the operations of the first voltage conversion unit 40 and the second voltage conversion unit 50 are stopped, it is continuously determined that the voltage of the conductive path 14 on the input side is equal to or less than the first threshold voltage until the ignition switch is turned off. When it is determined that the voltage of the conductive path 14 on the input side is equal to or less than the first threshold voltage, the processing from step S6 onward may be performed.

The following exemplifies effects of the present configuration.

The vehicle power supply device 1 is able to cause both the first voltage conversion unit 40 and the second voltage conversion unit 50 to perform charging operations as illustrated in FIG. 3 when the control unit 60 performs the quick charging control. Because the charging time of the second power supply unit 5 can be shortened due to the quick charging control, the charging voltage of the second power supply unit 5 can be easily raised in a short time to a suitable level, and the situation in which the timing of the power supply being cut off arrives during the quick charging control is less likely to occur.

In addition, the first voltage conversion unit 40 is caused to perform a charging operation and the second voltage conversion unit 50 is caused to perform a discharging operation as illustrated in FIG. 4 when the control unit 60 performs the charging/discharging control. That is, during the charging/discharging control in FIG. 4, even when, hypothetically, the power supply from the first power supply unit 3 is interrupted during the charging due to the charging/discharging control, the charging state of the second power supply unit 5 is continuously maintained before and after the interruption because the discharging operation of the second power supply unit 5 can be continued by the second voltage conversion unit 50 while the charging operation of the second power supply unit 5 is being performed by the first voltage conversion unit 40.

Furthermore, because two useful controls can be used separately with regard to the "problem of the power supply of the first power supply unit 3 being interrupted during charging" in this way, the above problem can be addressed and freedom for charging the second power supply unit 5 can be improved.

As illustrated in FIG. 2, the control unit 60 functions so as to perform the quick charging control when the ignition switch (starting switch) for switching to a state in which the vehicle in which the power supply device 1 is mounted can travel, is turned on, and so as to perform the charging/discharging control after the ignition switch has been turned on and the predetermined condition has been established. The power supply device 1 configured in this way is able to promptly increase the output voltage because the charging is performed quickly after the ignition switch has been turned on even when the output voltage of the second power supply unit 5 is at a relatively low level at the point in time that the ignition switch is turned on. That is, after the ignition switch has been turned on, the second power supply unit 5 can be made to recover in a short time from the low level state. When the predetermined condition has been established after starting the quick charging control, the quick charging control can be completed early and switched to the charging/discharging control that is resistant to the interruption of power of the first power supply unit 3 (a control in which, even if the power is interrupted, the discharging is maintained at that point in time).

In addition, the control unit 60 performs the charging/discharging control when at least a shift operation has been performed in the vehicle in which the power supply device 1 is mounted after the ignition switch (starting switch) has been turned on. The vehicle power supply device 1 configured in this way is able to promptly increase the output voltage of the second power supply unit 5 before the vehicle travels and the second power supply unit 5 can be recovered at an earlier stage from a low level state because the quick charging control can be performed before the shift operation is performed. The control can be switched to the charging/discharging control after at least the shift operation has been performed. That is, after the possibility of the vehicle entering a traveling state has been established, the complete cutoff of power during traveling can be prevented by switching to a control that is resistant to the power interruption of the first power supply unit 3 (a control in which, even when a power interruption occurs, discharging is maintained at that point in time).

In addition, the control unit 60 performs the charging/discharging control when at least a fixed time period has elapsed after the ignition switch (starting switch) has been turned on. During the initial stage after the ignition switch has been turned on and before the fixed time period has elapsed, the vehicle power supply device 1 configured in this way is able to promptly increase the output voltage of the second power supply unit 5 and enable the second power supply unit 5 to recover earlier from a low level state because the quick charging control can be performed. After at least the fixed time period has elapsed, the charging/discharging control can be completed at an earlier stage and the control can be switched to the charging/discharging control that is resistant to the power interruption of the first power supply unit 3 (a control in which, even if the power is interrupted, the discharging is maintained at that point in time).

The vehicle power supply device 1 has the semiconductor switch 73 (switching unit) provided with: the switch part 73B that is disposed in the third conductive path 23, has one end electrically connected to the second voltage conversion unit 50, has the other end electrically connected to the conductive path 16 on the output side, and switches between on and off; and a diode 73A that is provided in parallel to the switch part 73B, has an anode electrically connected to the second voltage conversion unit 50, and a cathode electrically connected to the conductive path 16 on the output side. The control unit 60 performs the quick charging control while the switch part 73B is on, and performs the charging/discharging control while the switch part 73B is off. The power supply device 1 configured in this way is able to allow the current to flow to the second voltage conversion unit 50 from the conductive path 14 on the input side and through the second conductive path 22 and the third conductive path 23, by turning on the switch part 73B of the semiconductor switch 73 (switching unit) while performing the quick charging control. Alternatively, while performing the charging/discharging control, the power supply device 1 interrupts the flow of the current to the second voltage conversion unit 50 from the conductive path 14 on the input side and through the second conductive path 22 and the third conductive path 23 by turning off the switch part 73B, and enables the current output from the second voltage conversion unit 50 to flow toward the conductive path 16 on the output side due to the presence of the diode 73A provided in parallel to the switch part 73B.

The vehicle power supply device 1 is provided with the abnormality detection unit that detects at least an abnormality of the voltage of the conductive path 14 on the input side. The control unit 60 performs the one-side discharging control in which the operation of the first voltage conversion unit 40 is stopped and the second voltage conversion unit 50 is caused to perform a discharging operation when an abnormality is detected by the abnormality detection unit when the quick charging control or the charging/discharging control is being performed.

The power supply device 1 configured in this way is able to cause the second voltage conversion unit 50 to perform the discharging operation and maintain the power supply state while stopping the operation of the first voltage conversion unit 40 and carrying out protection because the control unit 60 performs the one-side discharging control when an abnormality is detected by the abnormality detection unit while the quick charging control or the charging/discharging control are being performed. In particular, when the control is switched to the one-side discharging control when an abnormality occurs on the conductive path 14 on the input side while the charging/discharging control is being performed, a situation is less likely to occur in which the power supply immediately after the occurrence of the abnormality is completely cutoff, because the discharging operation of the second voltage conversion unit 50 can be continued before and after the abnormality.

The power supply device 1 has the semiconductor switches 71 and 72 (second switching unit) that switch between on, in which a current between the conductive path 14 on the input side and the third conductive path 23 is allowed to flow, and off, in which said current is interrupted. The control unit 60 turns on the semiconductor switches 71 and 72 (second switching unit) while executing the quick charging control and the charging/discharging control, and turns off the semiconductor switches 71 and 72 (second switching unit) while executing the one-side discharging control.

When performing the quick charging control, the power supply device 1 turns the semiconductor switches 71 and 72 (second switching unit) on (state that allows the current to flow between the conductive path 14 on the input side and the third conductive path 23) and makes it possible for the current to flow from the conductive path 14 on the input side through the second conductive path 22 and the third conductive path 23 to the second voltage conversion unit 50. However, when the one-side discharging control is performed in response to the occurrence of an abnormality, the flow of the discharging current from the second voltage conversion unit 50 to the conductive path 14 on the input side where the abnormality occurred can be prevented because the semiconductor switches 71 and 72 (second switching unit) are turned off.

The first voltage conversion unit 40 is able to perform the charging operation for stepping down the voltage applied to the first conductive path 21 and outputting the voltage to the conductive path 24 on the second power supply unit side, and the discharging operation for stepping up the voltage applied to the conductive path 24 on the second power supply unit side and outputting the voltage to the first conductive path 21. The control unit 60 is able to perform the quick discharging control for causing the first voltage conversion unit 40 to perform the discharging operation and causing the second voltage conversion unit 50 to perform the discharging operation. The vehicle power supply device 1 is able to cause either of the first voltage conversion unit 40 and the second voltage conversion unit 50 to perform the discharging operation as needed which is advantageous when it is desirable to increase the discharging capacity of the second power supply unit 5.

The power supply device 1 has the voltage detection unit for detecting the output voltage of the second power supply unit 5. The control unit 60 functions so as to perform at least the quick discharging control when the output voltage of the second power supply unit 5 detected by the voltage detection unit is equal to or less than a fixed value (second threshold voltage). According to the present configuration, the second power supply unit 5 can be used in a lower voltage range if the quick discharging control is performed when the output voltage of the second power supply unit 5 is low. Consequently, the voltage range in which use of the second power supply unit 5 is possible can be widened.

Other Embodiments

The present disclosure is not limited to the embodiment explained with reference to the above language and diagrams and the following embodiments, for example, are included within the technical scope of the present disclosure.

In the first embodiment, the first voltage conversion unit 40 is configured to be able to perform the step-down operation for stepping down the voltage applied to the first conductive path 21 and applying the voltage to the conductive path 24 on the second power supply unit side, and perform the step-up operation for stepping up the voltage applied to the conductive path 24 on the second power supply unit side and applying the voltage to the first conductive path 21. However, in the first embodiment or any example in which the first embodiment is modified, in a configuration in which the output voltage of the second power supply unit 5 is greater than the output voltage of the first power supply unit 3, the first voltage conversion unit 40 may be configured to perform the step-up operation (charging operation) for stepping up the voltage applied to the first conductive path 21 and applying the voltage to the conductive path 24 on the second power supply unit side, and the step-down operation (discharging operation) for stepping down the voltage applied to the conductive path 24 on the second power supply unit side and applying the voltage to the first conductive path 21. Similarly, the second voltage conversion unit 50 may be configured to perform the step-up operation (charging operation) for stepping up the voltage applied to the third conductive path 23 and applying the voltage to the conductive path 24 on the second power supply unit side, and the step-down operation (discharging operation) for stepping down the voltage applied to the conductive path 24 on the second power supply unit side and applying the voltage to the third conductive path 23.

While an example is described in the first embodiment in which the first voltage conversion unit 40 and the second voltage conversion unit 50 are both configured as single phase DCDC converters, one or both of the first voltage conversion unit 40 and the second voltage conversion unit 50 may be configured as multi-phase DCDC converters in the first embodiment or any example in which the first embodiment is modified. For example, when a multiphase structure is established in which a plurality of the first voltage conversion units 40 illustrated in FIG. 1 are provided, the drain of the switching element 41 and one end of the capacitor 44 in each of the first voltage conversion units 40 may be electrically connected to the first conductive path 21, one end of the inductor 43 of each of the first voltage conversion units 40 may be connected to the conductive path 24 on the second power supply unit side, and the other end of the capacitor 44 and the source of the switching element 42 of each of the first voltage conversion units 40 may be connected in parallel so as to be electrically connected to one end (end part on opposite side from the ground) of the resistor 83A. Additionally, when a multiphase structure is established in which a plurality of the second voltage conversion units 50 illustrated in FIG. 1 are provided, the drain of the switching element 51 and one end of the capacitor 54 of each of the second voltage conversion units 50 may be electrically connected to the third conductive path 23, one end of the inductor 43 of each of the second voltage conversion units 50 may be electrically connected to the conductive path 24 on the second power supply unit side, and the other end of the capacitor 54 and the source of the switching element 52 of each of the second voltage conversion units 50 may be connected in parallel so as to be electrically connected to one end of the resistor 83A.

While the first embodiment describes an example in which both the first voltage conversion unit 40 and the second voltage conversion unit 50 are configured as synchronous rectification DCDC converters, the first voltage conversion unit 40 and the second voltage conversion unit 50 may be configured as diode-type DCDC converters in which a portion of the switching elements are replaced by diodes in the first embodiment or any example in which the first embodiment is modified.

While the first embodiment describes a configuration for detecting that the ignition switch (starting switch) is on by means of the ignition on-signal, a configuration may be used in which the fact that the ignition switch has been turned on is identified in the first embodiment or any example in which the first embodiment is modified. For example, a case in which communication is possible with an in-vehicle communication system such as CAN and the like may be used as a case in which the starting switch is on.

In addition, the starting switch is not limited to an ignition switch and an electric vehicle system (EV system) or the like may be used when, for example, the vehicle is an electric vehicle or the like.

While switching elements configured as N-channel MOSFETs are described as the semiconductor switches 71, 72, and 73 and the switching elements 41, 42, 51, and 52, the switching elements may be P-channel MOSFETs, may be other switching elements such as bipolar transistors or IGBTs and the like, or a portion thereof may be replaced by mechanical relays in the first embodiment or any example in which the first embodiment is modified.

While the control unit 60 corresponding to the abnormality detection unit determines that there is an abnormality when a voltage drop is detected in the conductive path 14 on the input side in step S4 in FIG. 2 in the first embodiment, an abnormality may be determined when an overvoltage state is detected in which the voltage of the conductive path 14 on the input side exceeds a predetermined overvoltage threshold, or an abnormality may be determined when an overcurrent state is detected in which the current of the conductive path 14 on the input side exceeds a predetermined overcurrent threshold in the first embodiment or any example in which the first embodiment is modified. For example, the control unit 60 may advance the processing to step S6 when the aforementioned overcurrent state abnormality is detected by the abnormality detection unit while the quick charging control or the charging/discharging control is being performed, and the control unit 60 may perform the one-side discharging control so as to stop the operation of the first voltage conversion unit 40 and cause the second voltage conversion unit 50 to perform the discharging operation.

The invention claimed is:

1. A vehicle power supply device comprising:
a first conductive path electrically connected to a conductive path on an input side that serves as a power pathway from a first power supply;
a second conductive path that is electrically connected to the conductive path on the input side and branches off as a path different from the first conductive path, and is electrically connected to a conductive path on an output side;
a third conductive path that is electrically connected to the second conductive path and the conductive path on the output side;
a first voltage converter that performs at least a charging operation for stepping up or stepping down the voltage applied to the first conductive path and applying an output voltage to a conductive path on a second power supply side connected to the second power supply;
a second voltage converter that performs at least a charging operation for stepping up or stepping down a voltage applied to the third conductive path and applying an output voltage to the conductive path on the second power supply side, and a discharging operation for stepping up or stepping down a voltage applied to the conductive path on the second power supply side and applying an output voltage to the third conductive path; and
a control unit that performs at least a quick charging control which causes the first voltage converter to perform the charging operation and causes the second voltage converter to perform the charging operation, and a charging/discharging control which causes the first voltage converter to perform the charging operation and causes the second voltage converter to perform the discharging operation.

2. The vehicle power supply device according to claim 1, wherein the control unit performs the quick charging control when a starting switch for switching a vehicle in which the power supply device is mounted to a state which allows travel, is turned on, and performs the charging/discharging control when a predetermined condition is established.

3. The vehicle power supply device according to claim 2, wherein the control unit performs the charging/discharging control when at least a shift operation of the vehicle in which the power source device is mounted is performed after the starting switch has been turned on.

4. The vehicle power supply device according to claim 2, wherein the control unit performs the charging/discharging control when at least a fixed time period has elapsed after the starting switch has been turned on.

5. The vehicle power supply device according to claim 1, further comprising:
a switch provided with: a switch part, which is disposed in the third conductive path, one end side of which is electrically connected to the second voltage converter, the other end side of which is electrically connected to the conductive path on the output side, and which switches between on and off; and a diode provided parallel to the switch, having an anode electrically connected to the second voltage converter, and a cathode electrically connected to the conductive path on the output side,
wherein the control unit performs the quick charging control while the switch part is on and performs the charging/discharging control while the switch part is off.

6. The vehicle power supply device according to claim 1, further comprising:
an abnormality detector that detects at least an abnormality of the voltage or current of the conductive path on the input side,
wherein, when an abnormality is detected by the abnormality detector while the quick charging control or the charging/discharging control is being performed, the control unit performs at least a one-side discharging control for stopping operation of the first voltage converter and for causing the second voltage converter to perform the discharging operation.

7. The vehicle power supply device according to claim 6 further comprising:
a second switch for switching between on, in which the flow of current between the conductive path on the input side and the third conductive path is allowed, and off, in which said flow is interrupted,
wherein the control unit turns the second switch on when executing the quick charging control and the charging/discharging control, and turns the second switch off when executing the one-side discharging control.

8. The vehicle power supply device according to claim 1, wherein the first voltage converter performs a charging operation for stepping up or stepping down a voltage applied to the first conductive path and outputting the voltage to the conductive path on the second power supply side, and a discharging operation for stepping up or stepping down a voltage applied to the conductive path on the second power supply side and outputting the voltage to the first conductive path; and
the control unit at least performs a quick discharging control for causing the second voltage converter to perform a discharging operation while causing the first voltage converter to perform a discharging operation.

9. The vehicle power supply device according to claim 8, further comprising:
a voltage detector for detecting the output voltage of the second power supply,
wherein the control unit performs the quick discharging control when at least the output voltage of the second power supply detected by the voltage detector is equal to or less than a fixed value.

* * * * *